United States Patent

[11] 3,581,177

| [72] | Inventor | Louis A. Hausknecht |
| | | 4504 State Road, Cleveland, Ohio 44109 |
| [21] | Appl. No. | 769,177 |
| [22] | Filed | Oct. 21, 1968 |
| [45] | Patented | May 25, 1971 |

[54] MOTOR SPEED CONTROL DEVICE
16 Claims, 6 Drawing Figs.

[52] U.S. Cl. .................................................. 318/330, 200/30, 318/346
[51] Int. Cl. .................................................. H02p 7/06
[50] Field of Search .......................................... 318/330, 346; 200/30, inquired

[56] References Cited
UNITED STATES PATENTS

| 3,441,828 | 4/1969 | Henry | 318/345 |
| 2,489,812 | 11/1949 | Person | 200/30 |
| 3,181,048 | 4/1965 | Ficek et al. | 318/346X |
| 3,317,808 | 5/1967 | Yott | 318/346 |

Primary Examiner—Benjamin Dobeck
Assistant Examiner—H. Huberfeld
Attorney—Harlan E. Hummer ABSTRACT: A system for controlling the speed of a direct current motor. The system employs a pair of breaker points for opening and closing the circuit containing the motor. By varying the frequency of contact between the breaker points and the period of time the points are in contact, different pulsations of current are transmitted to the motor to regulate its speed.

PATENTED MAY 25 1971

INVENTOR
LOUIS A. HAUSKNECHT

BY *Jerome F. Kramer*

ATTORNEYS

INVENTOR
LOUIS A. HAUSKNECHT

BY
ATTORNEYS

MOTOR SPEED CONTROL DEVICE

BACKGROUND OF INVENTION

As indicated, the invention is particularly useful in controlling the speed of a direct current motor. Many systems presently employed, utilize electrical devices such as variable rheostats for regulating a steady flow of current to the motor being operated. In such devices, power is lost, or dissipated in heat caused by the resistance in the circuit. Then too, the shaft of the motor rotates at relatively little torque at low operating speeds of the motor. This is readily apparent when slight pressure is applied to the rotating shaft of the motor at such speeds.

The invention is designed to substantially eliminate the disadvantages indicated above by utilizing what might be termed a mechanically operated apparatus for sending pulsations or surges of direct electrical current to the motor, rather than regulating a steady flow of current to the motor.

Briefly stated, the invention contemplates using a pair of breaker points for opening and closing a circuit containing a direct current motor. Means are provided for varying the frequency of contact between the points and the period of time the points are in contact, to regulate the frequency and strength of the pulsations of current transmitted to the motor. A capacitor in circuit with the motor, is charged and discharged as the breaker points move into and out of contact. The capacitor, when discharging, sends the pulsations of current to the motor.

The following description of the invention will be better understood by having reference to the annexed drawing, wherein.

DESCRIPTION OF THE INVENTION

Figure 1:
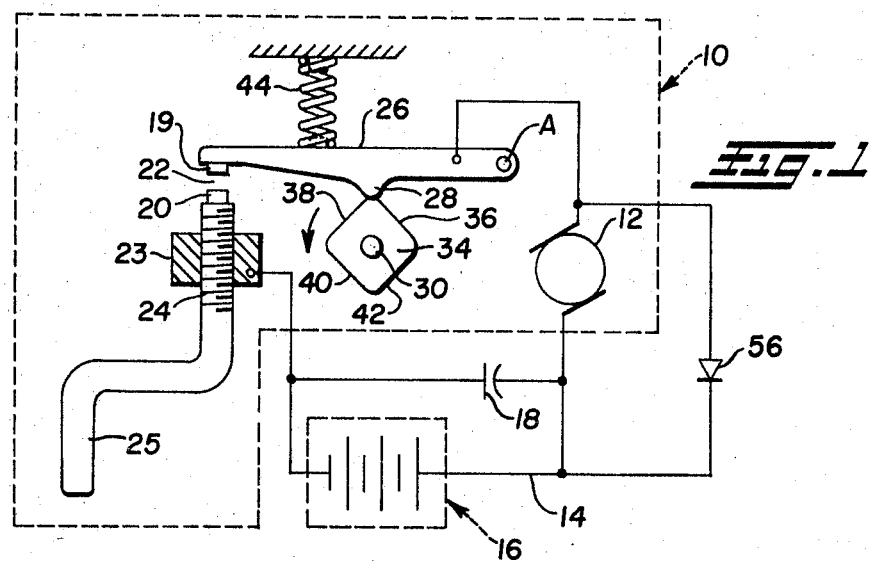
FIG. 1 is a schematic drawing showing an embodiment of the invention.
Figure 2:
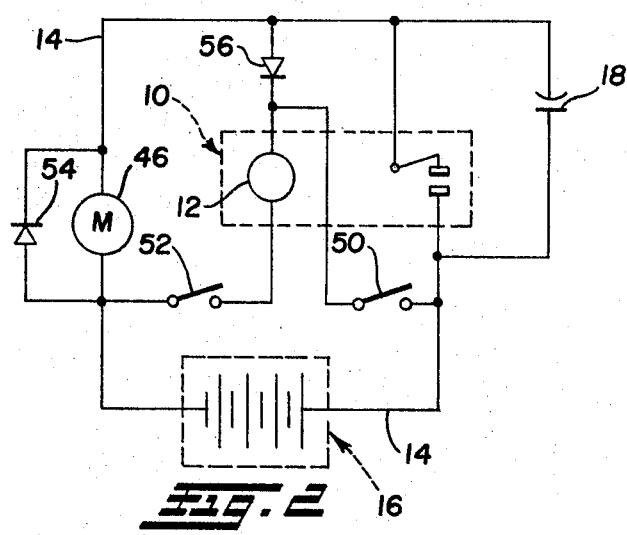
FIG. 2 is a schematic drawing showing the embodiment of FIG. 1 in a more refined circuit.

Referring more particularly to FIGS. 1 and 2 of the drawing, there is shown a mechanism or device, generally indicated at 10, for controlling the speed of a DC (direct current) motor 12. The motor speed control device 10 and DC motor 12 are placed in circuit 14 with a source of direct electrical current, e.g., battery 16, and a capacitor 18.

The motor speed control device 10 comprises a pair of contact or breaker points 19 and 20, which are movable relative to each other into and out of contact for opening and closing the circuit 14 to discharge and charge the capacitor 18. As viewed in the drawing, the breaker point 20 is adjustable towards and away from the other breaker point 19 which, in turn, is mechanically driven into and out of contact with the adjustable breaker point 20.

The gap 22 between the breaker points 19 and 20, is varied by adjusting or rotating the screw 24 carrying the adjustable breaker point 20. The screw 24 as it rotates, moves axially through a fixed guide block 23 towards the movable breaker point 19. A handle 25 is provided for conveniently rotating the screw 24.

The movable breaker point 18 is carried by a breaker arm 26, which is pivotally mounted at point A for rotation towards and away from the adjustable breaker point 20. A cam follower 28 is associated with the breaker arm 26 and extends therefrom.

The DC motor 12 is mounted adjacent the breaker arm 26 and has a rotatable shaft 30 extending therefrom. A rotor 34, provided with a plurality of cam surfaces 36, 38, 40, and 42, is coupled to the motor shaft 32 for unitary rotational movement therewith.

A spring 44, fastened to the breaker arm 26, maintains the cam follower 28 in biased engaged relation against the cam surfaces 36—42 of the rotor 34. Thus, the movable breaker point 19 moves in response to movement of the cam surfaces 36—42, or rotation of the rotor 34. It should be appreciated from FIG. 1, that the movable breaker point 19 will move into contact with the adjustable breaker point 20 four times for every rotation of the rotor 34.

In this particular embodiment where the rotor 34 is mounted directly on the shaft 30 of the driven motor 12, the amplitude and frequency of pulsations of current sent to the motor 12, are varied by a single adjustment of the gap 22 between the breaker points 19 and 20. As seen in FIG. 2, the motor 12 can be used as a pilot motor to drive a larger motor 46 which is wired to operate in unison with the pilot motor 12.

The capacitor 18 is charged and discharges relative to the frequency of contact between the breaker points 19 and 20, and the period of time said points are in contact. Correspondingly, weaker or stronger pulsations of current are transmitted to the pilot motor 12 from the capacitor 18 as it discharges.

FIG. 2 represents a more refined electrical circuit 14, which utilizes a pair of microswitches 50 and 52 to initially energize the circuit 14 to operate the pilot motor 12, and bypass operation of the pilot motor 12 when the larger motor 46 is operating at maximum speeds. The microswitch 50 is in a normally open position and the microswitch 52 is in a normally closed position. The microswitch 50 closes when the handle 25 is initially rotated to begin closing the gap 22 between the breaker points 19 and 20, to place the pilot motor 12 and battery 16 in electrical communication. Further operation of the handle 25 acts to reopen the microswitch 50 and break the circuit. Thus, the pilot motor 12 is initially activated. A rectifier 56 is provided to keep electrical current in said closed circuit from passing into the larger motor 46. The microswitch 52 will move to its open position when the motor speed control device 10, is operating with the breaker points 18 and 20 in continuous contact. This shuts down the circuit including the pilot motor 12, and places the larger motor 46 in direct electrical communication with the battery 16. The reverse is true when the handle 25 is rotated in the opposite direction to increase the gap 22 between the breaker points 18 and 20, and bring them back to their restive position out of contact with each other. Another conventionally designed rectifier 54 is placed in the circuit to eliminate current feedback through the pilot motor 12 and the larger motor 46.

Figure 3:
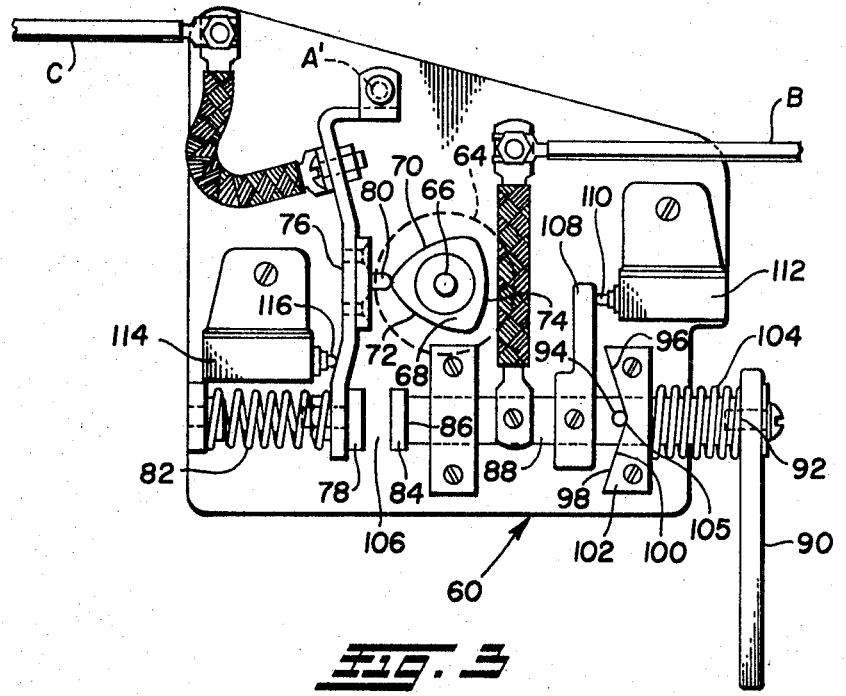
FIG. 3 is an enlarged view of another embodiment of the invention.
Figure 4:
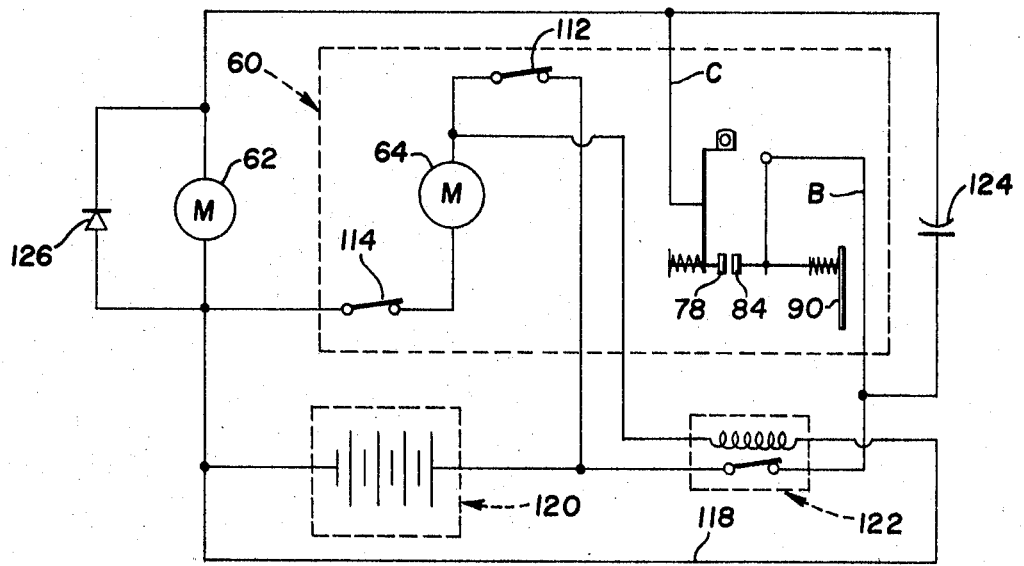
FIG. 4 is a schematic drawing showing the embodiment of FIG. 3 in circuit.

Referring more particularly to FIGS. 3 and 4, there is shown another apparatus or device 60 for controlling the speed of a DC motor 62. This particular system employs a pilot motor 64 which is driven at a predetermined constant rate of speed such that the breaker points will preferably contact between 40 to 100 times per second.

The pilot motor 64 has a rotatable shaft 66 extending therefrom. A rotor 68 having a plurality of cam surfaces 70, 72, and 74, is coupled to the extended motor shaft 66 for unitary rotation therewith.

A breaker arm 76 is pivotally mounted for rotation about point A′, and carries a breaker point 78. A cam follower 80 is associated with the breaker arm 76 for riding engagement on the cam surfaces 70—74 of the rotor 68. A spring 82 coacting with the breaker arm 76, is provided for holding the cam follower 80 in biased relation against the cam surfaces 70—74.

An adjustable breaker point 84 is mounted for movement towards and away from the movable breaker point 78 carried by the breaker arm 76. The adjustable breaker point 84 is secured at one end 86 of a rotatable, longitudinally moving shaft 88. A handle 90 is provided at the other end 92 of the rotatable shaft 88.

A pin 94 extends from the shaft 88, and is designed to ride along intersecting surfaces 96 and 98 of a V-shaped notch 100 provided in a fixed guide block 102 through which the shaft 88 extends.

A spring 104 surrounds the shaft 88 between the block 102 and handle 90, and biases the adjustable breaker point 84 away from the movable breaker point 78, and into its restive position where the pin 94 rests in the crotch 105, of the V-shaped notch 100. As the handle 90 is rotated, the pin 94 travels along either sloped surface 96 or 98 to move the shaft 88 longitudinally and reduce the gap 106 between the breaker points 78 and 84. The adjustment of gap 106 is much faster than that disclosed in the embodiment of FIG. 1.

A dowel or lever 108 is coupled to the shaft 88 adjacent the pin 94, and extends therefrom for engaging an actuating pin 110 extending from microswitch 112, which is mounted adjacent the guide block 102. The dowel 108 will move out of engagement with the actuating pin 110, as the shaft 88 moves longitudinally towards the movable breaker point 78. This causes the microswitch 112, to move to its closed position, to activate the pilot motor 64 and solenoid contactor 122.

A microswitch 114 is mounted adjacent the breaker arm 76, and is provided with an actuating pin 116 for engaging the breaker arm 76 when the breaker points 78 and 84 are in continuous engaged relation during maximum speeds of the driven motor 62. The microswitch 114 moves to its open position to shut down operation of the pilot motor 64. Wires or leads B and C are in electrical communication with the breaker points 84 and 78, respectively, through the shaft 88 and breaker arm 76. The motor speed controlled device 60 is placed in an electrical circuit 118 with the driven motor 62 and a source of direct electrical current, e.g., battery 120.

A conventionally designed solenoid contactor 122 is wired in parallel with the pilot motor 64. When the handle 90 is rotated to close the gap 106 between the breaker points 78 and 86, the microswitch 112, moves to a closed position to complete the circuit 118. The solenoid contactor 122 places the breaker points 78 and 86 in electrical communication with the driven motor 62. The solenoid contactor 122 remains in electrical communication with the driven motor 62 so long as the microswitch 112 is closed. Similarly, a conventionally designed capacitor 124 is placed in the circuit 118 for charging and discharging as the breaker points 78 and 84 move into and out of contact, the capacitor 124 discharging pulsations of direct electrical current to the driven motor 62. A rectifier 126 is also utilized to keep electrical feedback from going to the breaker points 78 and 86 and capacitor 124 from the driven motor 62.

An example of components used in the aforementioned system for controlling the speed of a direct current motor, is a pilot motor 64 having a horsepower ranging between one twenty-fifth and one thirty-fifth h.p. A 12-volt battery 120 can be used along with a solenoid contactor 122 having a 200-ampere rating. The capacitor 124 has a rating of 5,000 microfarads at 55 volts, and the rectifier 126 has a 25-ampere rating at 200 volts.

The above equipment could be utilized to drive a motor having, for example, 2 horsepower.

As previously indicated, the breaker points 78 and 84 should contact preferably in the range of from between 40 to 100 times per second. The device will operate when the breaker points 78 and 84 are making contact within the broader range of from 25 to 300 times per second, but not as effectively as within the preferred range.

Also, as indicated, the pilot motor 64 is run at a constant speed to provide the preferred range of contact between the breaker points 78 and 84 as indicated above, since the pilot motor 64 in this particular embodiment is utilized only to rotate the rotor 70 and consequently operate the breaker arm 76 carrying the breaker point 78.

Figure 5:
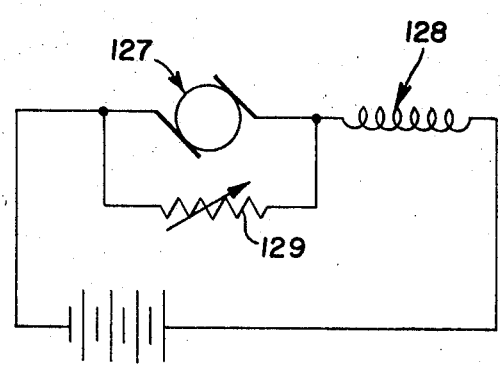
FIG. 5 is a schematic drawing of a system utilized for varying relative movement between the armature and field coil of a series wound direct current motor.

FIG. 5 shows one means of varying the speed of the pilot motor 64 to maintain it operating such that the breaker points 78 and 84 contact within the preferred range of from 40 to 100 times per second. Such means are particularly useful in a series wound DC motor having an armature 127 and field coil 128 which are movable relative to each other. A variable resistor 129 is wired in parallel with the armature 127. The minimum resistance of the variable resistor 129 should be less than the resistance of the armature 127. Thus, the variable resistor 129, when set at a low value of resistance, acts as an electrical bypass for current flowing through the armature 127 into the field coil 128. The increased current in the field coil 128, strengthens the electromagnetic field of the coil 128, while less current passes through the armature 127 to decrease its electromagnetic field. In this way, for example, the speed of rotation of the armature 127, can be varied within a speed range such that the contact between the breaker points is within the preferred range indicated above. This apparatus is better than using electrical devices such as rheostats in series with the motor, since there is no loss in torque at which the motor shaft rotates. In fact, the shaft rotates at greater torque as the speed of rotation of the shaft decreases.

Figure 6:
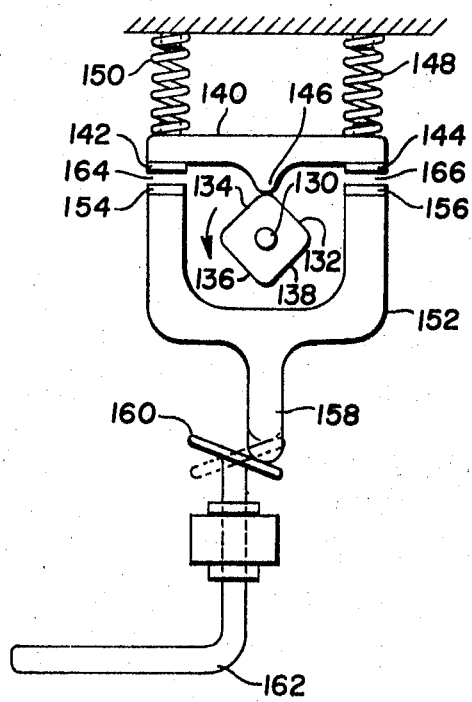
FIG. 6 is an enlarged view of still another embodiment of the invention utilizing more than one pair of breaker points.

Referring more particularly to FIG. 6, there is shown another embodiment utilizing a plurality of pairs of breaker points. In this particular embodiment, the rotor 130 has four cam surfaces 132, 134, 136, and 138. The breaker arm 140 carries a pair of spaced breaker points 142 and 144, and has a cam follower 146 intermediate the points for riding on the cam surfaces 132—138. Springs 148 and 150 are provided for biasing the cam follower 146 against the cam surfaces 132-—138.

An adjustable fork 152 carries a pair of breaker points 154 and 156 for contacting engagement with opposing breaker points 142 and 144, respectively. The fork 152 is provided with a single end 158 which rests on a sloping or tilted cam 160 which is eccentrically disposed to the longitudinal axis of the fork 152. The cam 160 is provided with a handle 162 for rotating the cam 160. The cam 160, as it rotates, moves the fork 152 axially to adjust the gap 164 and 166 between the opposing pairs of breaker points 142 and 154 and 144 and 156, respectively. Other devices can be designed to accommodate any number of breaker points.

Thus, there has been provided a new and novel apparatus for controlling the speed of a direct current motor by sending pulses of current at varying amplitudes and frequencies to the motor. This apparatus is more mechanical in nature and does not rely on electrical devices such as variable rheostats to control a steady flow of electrical current to the motor.

I claim:

1. An apparatus for controlling the speed of a direct current motor, comprising in combination:
    a. an electrical circuit, including a source of direct electrical current;
    b. a motor disposed in the circuit, said motor having a shaft rotatable in response to direct electrical current in the circuit;
    c. a capacitor disposed in electrical communication with the motor for sending pulsations of direct electrical current to the motor as the capacitor discharges; and
    d. means for alternately closing and opening the circuit more than once for every revolution of the shaft to charge and discharge the capacitor.

2. The apparatus of claim 1, wherein the means includes means which are mechanically actuated to open and close the circuit.

3. The apparatus of claim 1, which includes:
    e. means for varying the period of time that the circuit is closed.

4. The apparatus of claim 3, wherein the circuit opening and closing means includes a pair of spaced breaker points mounted for relative movement into and out of contacting relation.

5. The apparatus of claim 4, wherein said means for varying the period of time the circuit is closed, includes means for varying the space between the breaker points.

6. The apparatus of claim 5, wherein the means for varying the frequency of closing the circuit, includes means coupled to the shaft of the motor for reciprocating at least one of said pair of breaker points through a predetermined arc unless interrupted by the other of said pair of breaker points, and at a frequency greater than once for every revolution of said shaft.

7. The apparatus of claim 6, wherein the means for reciprocating at least one of said pair of breaker points, includes a rotor with a plurality of cam surfaces which are equidistant from said shaft, and a cam follower extending from said movable breaker point for riding engagement on said cam surfaces.

8. The apparatus of claim 5, wherein the means for varying the frequency of closing the circuit includes means for closing the circuit at a frequency within a predetermined range of frequencies.

9. The apparatus of claim 8, wherein the predetermined range of frequencies includes closing the circuit between about 40 to about 100 times per second.

10. An apparatus for controlling the speed of a direct current motor, comprising in combination:
   a. a motor disposed in electrical communication with a source of direct electrical current and operated by current therefrom, said motor having a rotatable shaft extending therefrom;
   b. a rotor concentrically coupled to the shaft for rotation therewith, said rotor having a plurality of configured cam surfaces equidistantly spaced from the shaft;
   c. a first breaker point reciprocable through a predetermined distance relative to the number and configuration of the cam surfaces;
   d. means associated with said first breaker point for riding engagement on the cam surfaces of said rotor to reciprocate said point in response to rotation of said rotor;
   e. a second breaker point disposed in spaced relation from said first breaker point for interrupting contacting relation with said first breaker point as it reciprocates;
   f. means for moving the second breaker point towards and away from the first breaker point to vary the spacing between the breaker points; and
   g. a capacitor disposed in electrical communication with said motor and charged and discharged as said points move into and out of contact.

11. The apparatus of claim 10, wherein the means associated with said first breaker point, includes an arm pivotally mounted adjacent the rotor and carrying said first breaker point, a cam follower associated with the arm and riding on the cam surfaces of the rotor, and means for biasing the cam follower against the cam surfaces of the rotor.

12. The apparatus of claim 11, which includes means for operating the motor coupled to the rotor, at a predetermined speed to move the breaker points into contacting relation at a frequency within a predetermined range of frequencies.

13. The apparatus of claim 12, wherein the frequency at which the points contact is in the range of from about 40 to about 100 times per second.

14. An apparatus for controlling the speed of a direct current motor, comprising in combination:
   a. an electrical circuit;
   b. a motor disposed in the circuit and operable in response to direct electrical current in said circuit;
   c. means for alternately opening and closing the circuit to send pulsations of current to said motor, said means including a pair of spaced breaker points mounted for relative movement into and out of contacting relation;
   d. means for varying the frequency of closing the circuit, said means including a rotor mounted for unitary rotation on a shaft of the motor, said rotor having a plurality of cam surfaces equidistantly spaced from the shaft of the motor, and a cam follower carried by one of said pair of breaker points for riding engagement on said cam surfaces to reciprocate said one breaker point more than once for every revolution of the shaft of the motor;
   e. means for varying the period of time that the circuit is closed, said means including means for varying the spacing between the breaker points; and
   f. a capacitor disposed in the circuit and charged and discharged as the breaker points move into and out of contact.

15. An apparatus for controlling the speed of a direct current motor, comprising in combination:
   a. an electrical circuit;
   b. a motor disposed in the circuit and operable in response to direct electrical current in said circuit;
   c. means for alternately opening and closing the circuit to send pulsations of current to said motor, said means including a pair of spaced breaker points mounted for relative movement into and out of contacting relation;
   d. means for varying the frequency of closing the circuit, said means including means coupled to the shaft of the motor for reciprocating at least one of said pair of breaker points through a predetermined arc unless interrupted by the other of said pair of breaker points and at a frequency greater than once for every revolution of the shaft of the motor;
   e. means for varying the period of time that the circuit is closed, including means for varying the spacing between the breaker points; and
   f. a capacitor disposed in the circuit and charged and discharged as the breaker points move into and out of contact.

16. The apparatus of claim 15, which includes a battery in the circuit as a source of power, and a rectifier in the circuit to stop electrical feedback through the motor.